United States Patent [19]

Go

[11] 4,076,693
[45] Feb. 28, 1978

[54] TEREPHTHALIC ACID/P,P-SULFONYLDIBENZOIC ACID/ETHYLENE GLYCOL/NEOPENTYL GLYCOL POLYESTER COMPOSITIONS AND CONTAINERS MADE THEREFROM

[75] Inventor: Santos W. Go, Toledo, Ohio

[73] Assignee: Owens-Illinois, Inc., Toledo, Ohio

[21] Appl. No.: 643,282

[22] Filed: Dec. 22, 1975

[51] Int. Cl.$^2$ ............................................. C08G 63/68
[52] U.S. Cl. .................................. 260/75 S; 260/75 T
[58] Field of Search .................... 260/75 S, 75 T, 47 C

[56] References Cited

U.S. PATENT DOCUMENTS 3,972,852  8/1976  Inata et al. ..................... 260/47 C

FOREIGN PATENT DOCUMENTS

| 1,456,345 | 9/1966 | France | 260/75 R |
| 2,146,055 | 3/1973 | Germany | 260/75 R |
| 2,140,615 | 2/1973 | Germany | 260/75 R |
| 962,913 | 7/1964 | United Kingdom | 260/75 R |
| 1,044,015 | 9/1966 | United Kingdom | 260/75 R |

OTHER PUBLICATIONS

Chemical Abstracts, vol. 50, 16180–16183 (1956).
Ibid, vol. 78, 14844e and 160332y (1973).
Unexamined (Kokai) Japanese Patent Publication No: Showa 50-149787, Patent Application No: Showa 49-57791, May 24, 1974.
Unexamined (Kokai) Japanese Patent Publication No: Showa 50-136394, Patent Application No: Showa 49-43274, Apr. 19, 1974.

*Primary Examiner*—Lucille M. Phynes
*Attorney, Agent, or Firm*—Charles S. Lynch; E. J. Holler

[57] ABSTRACT

Copolyesters having an oxygen permeability of less than 15 cc. mil/100 in.$^2$·day·atm. (at 50% relative humidity and about 73° F.) and a glass transition temperature in excess of 72° C. and having the following four (4) repeating units are contemplated:

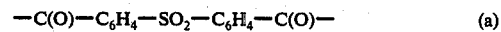

(a)

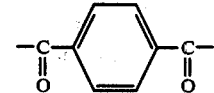

(b)

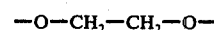

(c)

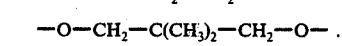

(d)

Based on reactant charges the ratio of (b) units: (a) units will be about 90:10 to about 40:60. Containers made of these polyesters for packaging products of commerce like comestibles are also contemplated.

3 Claims, No Drawings

TEREPHTHALIC ACID/P,P-SULFONYLDIBENZOIC ACID/ETHYLENE GLYCOL/NEOPENTYL GLYCOL POLYESTER COMPOSITIONS AND CONTAINERS MADE THEREFROM

BACKGROUND OF THE INVENTION

The present application is directed to prescribed polyester compositions and more specifically to copolyester compositions; additionally, the present application is directed to packaging methods and containers fabricated of these polyesters.

Packages, such as bottles, and their method of preparation, made of polyethylene terephthalate are disclosed in U.S. Pat. No. 3,733,309. These packages are biaxially oriented bottles and are disclosed to be manufacturable from a homopolymer of ethylene glycol and terephthalic acid or copolymers of ethylene terephthalate wherein up to 10 mole percent is prepared from the monomer units of for example diethylene glycol, propane-1,3-diol, butane 1,4 diol, 1,4-hydroxymethylcyclohexane, isophthalic acid, and the like. While bottles from the polyethylene terephthalate have quite satisfactory permeability characteristics which allow them to be used for packaging various products of commerce especially comestible items including foodstuffs, or medicines, they need improvement in order to allow them to satisfactorily withstand higher temperatures. Generally, as indicated above, the permeability characteristics of polyethylene terephthalate are satisfactory and typically an unoriented polyethylene terephthalate will have an oxygen permeability of around 8–10 cc.mil/100 in.$^2$·day·atm. and a $CO_2$ permeability of around 48 or 50. The glass transition temperature of polyethylene terephthalate, however, is on the order of about 72° C. and, whether a container made therefrom is unoriented or biaxially oriented, it will be realized that a higher glass transition temperature is needed in order to allow a container thereof to withstand higher temperatures. Thus a need exists for a polyester container which is capable of withstanding higher temperatures, for example, those encountered in an autoclaving procedure and even the temperatures quite frequently existing in warehouses, than PET.

As will be subsequently seen, the present invention provides containers of prescribed copolyesters which polyesters have glass transition temperatures in excess of 72° C. and which have satisfactory oxygen permeability characteristics thus making them ideally suited for forming oriented or unoriented containers or bottles and for the packaging of various products of commerce; additionally, these polyesters have the needed balance of properties to allow them to be melted and expediently formed into containers and the present copolyesters have decomposition points which are above normal processing temperatures so as not to cause any significant discoloration problems when synthesizing the composition and manufacturing bottles and packages therefrom.

While not directed to bottles, U.S. Pat. No. 3,862,084 mentions the homopolymer of ethylene glycol and terephthalic acid, as well as copolyesters from terephthalic acid and/or one or more different acids, e.g. isophthalic acid, and from ethylene glycol and/or one or more different alcohols, such as, neopentyl glycol, that is 2,2-dimethyl 1,3-propane diol.

A wide variety of copolyester compositions are known in the prior art. U.S. Pat. No. 3,522,215 discloses a composition formed from terephthalic acid, 1,4-cyclohexane dimethanol and a third, broadly disclosed, dicarboxylic acid (or ester) component which may, for example, be p,p'-sulfonyldibenzoic acid or p,p'-isopropylidenedibenzoic acid; as a fourth component, another acid or glycol can be used; the glycols disclosed include ethylene glycol, ether glycols, and branched glycols and carbocyclic glycols with neopentyl glycol (i.e., 2,2-dimethyl 1,3-propane diol) being set forth as a branched chain glycol. U.S. Pat. No. 3,547,888 discloses compositions formed from terephthalic acid (or its ester), 1,4-cyclohexane dimethanol and, for example, p,p'-sulfonyldibenzoic acid or p,p'-isopropylidenedibenzoic acid (or esters); reference may also be had to 78 Chemical Abstracts 160332y and German Offenlegungsschrift 2,146,055.

U.S. Pat. No. 2,744,094 discloses polyesters formed from p,p'-sulfonyldibenzoic acid (or its esters or acid chloride) plus an aromatic dibasic acid diester, and a polymethylene glycol, and/or an aliphatic ether glycol, and indicates that mixtures of straight chain alkane diols or ether glycols may be employed. U.S. Pat. No. 2,744,097 discloses polyesters from beta-hydroxyalkyl diesters of p,p'-sulfonyldibenzoic acid and dihydroxy compounds, for example, aliphatic ether glycols, and polymethylene glycols. U.S. Pat. No. 2,744,088 discloses polyesters of p,p'-sulfonyldibenzoic acid (or esters or acid chlorides), an aliphatic straight-chain dibasic acid, or ester thereof, and an alkylene glycol and/or aliphatic ether glycol; branched chain glycols are mentioned and ethylene glycol and neopentyl glycol (2,2 dimethyl-propane diol-1,3) are specifically set forth. The foregoing patents are discussed in Vol. 50 *Chemical Abstracts*, col. 16183 and other polyesters from p,p'-sulfonyldibenzoic acid are discussed in cols. 16180–16182.

U.S. Pat. No. 2,901,466, somewhat similar to some of the above patents, discloses linear polyesters formed from 1,4-cyclohexanedimethanol and one or more hexacarbocyclic dicarboxylic acids (or its ester or halide), e.g. p,p'-sulfonyldibenzoic acid, isophthalic acid, terephthalic acid; modifying glycols, e.g., ethylene glycol, ether glycols, neopentyl glycol (2,2'-dimethyl-1,3-propanediol), and carbocyclic glycols are also indicated.

German Offenlegungsschrift 2,140,615 and *Chemical Abstracts*, Vol. 78 148445e describe a linear polyester having a glass transition temperature of about 145° C. to about 163° C. which is made from ethylene glycol, neopentyl glycol (2,2'-dimethyl-1,3-propanediol) and bis(4-butoxycarbonylphenyl) sulfone (butyl ester of p,p'-sulfonyldibenzoic acid).

Recently issued U.S. Pat. No. 3,890,256 discloses polyesters formed from neopentyl glycol but indicates that, for its purposes of producing high impact and high tensile strength, such a glycol is unsatisfactory.

British Specification 962,913, and its Addition Patent 1,044,015, and French Brevet 1,456,345 disclose linear polyesters, optionally along with another glycol formed from 2,2, 4,4-tetramethyl 1,3-cyclobutane diol. Polyester forming acid reactants include terephthalic acid, isophthalic acid, and p,p'-sulfonyldibenzoic acid. Ethylene glycol and neopentyl glycol, as possible modifying alcohols, are indicated in all three documents. Thus, as will be seen from the foregoing, an extensive amount of work has been done with polyesters but little has been done to satisfy the needs of the packaging industry for an improved polyester container composition suitable for the packaging of various products, especially comestibles like foodstuffs or medicines, and the like. That is, no one has focused their attention on satisfying the need for providing a packaging container of a linear polyester having satisfactory oxygen permeability characteristics and a glass transition temperature higher than polyethylene terephthalate.

Thus in accordance with the present invention there is provided an improved polyester which can be melted and molded to a clear container for use in the packaging industry wherein the repeating units of the polyester, or the radicals remaining after transesterification, or esterification, and polycondensation consists essentially of (a), (b), (c), and (d) wherein

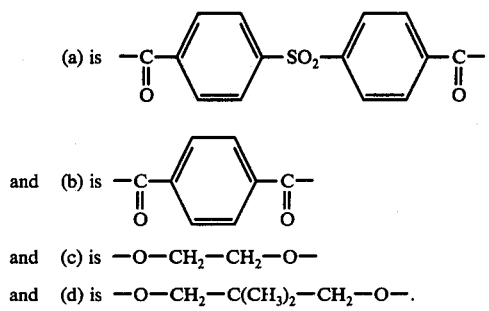

and (c) is —O—CH$_2$—CH$_2$—O— and (d) is —O—CH$_2$—C(CH$_3$)$_2$—CH$_2$—O—.

The polyesters contemplated herein have an oxygen permeability as measured by ASTM D-1434-66 of less than 15 cc.mil/100 in.$^2$·day·atm. and a glass transition temperature in excess of about 72° C. The mole ratio, based on the amounts of the reactants, i.e. the polyester forming precursor, used in the reaction, of the (b) units above to the (a) units above will be between about 90:10 and about 40:60 and the ratio of the (c) units above to (d) units above will be about 80:20. Generally the precursors of the (a) and (b) units as well as the (d) and (c) units react to form the polyesters in about the molar proportion used in the synthesis of the polyester.

The polyesters contemplated herein, and perhaps more accurately copolyesters, are the polyester products wherein units (a) are obtained from a polyester forming precursor which is p,p'-sulfonyldibenzoic acid, esters thereof, or acid halides thereof, and wherein the (b) units are obtained from terephthalic acid, esters or acid halides thereof. Units (c) and (d) above are, respectively, obtained from polyester forming precursors which are ethylene glycol and neopentyl glycol (2,2-dimethyl-1,3-propanediol).

Unit (b) above will be the radical obtained from a polyester forming precursor which is terephthalic acid, its esters, or halides, and the mole ratio of (b) units to (a) units will be between about 90:10 and 40:60 based on the mole ratio of the (b) and (a) precursors used for the reaction. An especially suitable linear copolyester for use in the packaging industry is a copolyester in which the (b) units indicated above are the radicals obtained from a precursor which is terephthalic acid, its esters, or halides, and wherein the ratio, based on the reactant proportions, of (b) to (a) units is about 50:50 and the ratio of (c) units to (d) units is about 80:20.

The esters contemplated above as the polyester forming precursor may be any of the well known esters e.g. aliphatic esters, or aromatic esters. Preferred aliphatic, or acyclic, esters are the alkyl esters having from 1 to about 4 carbon atoms with the methyl or ethyl esters being especially preferred. The phenyl esters are preferred aromatic esters. Instead of using the acid or esters, acid halides may likewise be employed with the acid chloride being quite suitable. Thus for example units (a) may be the polymerization radical obtained from p,p'-sulfonyldibenzoyldichloride and units (b) the polymerization radical obtained from terephthaloyldichloride.

The polyesters as contemplated herein may be synthesized by methods generally known in the art for producing polyesters wherein at least one polyester-forming dicarboxylic acid, ester, or halides thereof, is reactively combined with at least stoichiometric amounts of at least one polyester-forming dibasic alcohol under conditions of temperature pressure and catalysis as to form the polyester. In the usual procedure the method of reactively combining the acid, acid ester, or acid halide with the dibasic alcohol is a two-step process involving a transesterification step, or esterification step depending on the starting materials, followed by a polycondensation step with the reaction being done in a melt condition. Temperatures employed which will be quite suitable for forming the present polyesters will be between about 200° or 210° C. up to about 300° C. or so. Additionally in the usual procedure a stoichiometric excess of glycol will be employed, with the mole ratio of ethylene glycol to neopentyl glycol being about 80:20. Generally the amount will be between about 2 to about 3 moles of total glycol per mole of total dicarboxylic acid, or ester, or halide, employed with a quite convenient amount being about 2.5 moles.

Conventional catalysts are likewise employed. For example transesterification is effected in the presence of effective catalytic amounts of transition metal compounds, alkaline earth metal compounds, or alkali metal compounds, for example the acetates, oxides, phenoxides, and alkoxides. Specific suitable catalysts will be, for example, zinc acetate manganese acetate, magnesium acetate, and calcium acetate, and titanium alkoxides like titanium tetrabutoxides. Suitable polycondensation catalysts include for example antimony acetate, antimony trioxide, titanium alkoxide, and organotinoxides, for example stannous alkoxides. Usually the catalysts will be present in an amount of about $10^{-5}$ to about $10^{-3}$ moles of catalysts per mole of total acid, ester, or halide employed.

In performing the reaction the reactant proportions, of course, will be selected as indicated previously. Additionally as previously indicated units (a) and (b) of the polyester are, relative to themselves, present in about the same ratio as that of their precursors in the reaction charge. Similarly the ratio of (d) to (c) units will be about the same as the molar ratio used in the reaction for their precursors.

The present invention also contemplates an improvement in methods of packaging products wherein a product is placed into a polyester container by employing the polyesters described herein as the polyesters from which the container is formed. Thus for example all that is required is to form an appropriate container of the polyesters contemplated herein and then using that container to package foodstuffs, beverages, medicines, and the like.

The present polyesters can be melt molded into containers, for example bottles, and these containers will be clear i.e., to the unaided eye the container will be transparent thereby allowing for the visual observation of the packaged product through the container walls. In passing it should be mentioned that when the term melt-molded is employed herein this contemplates conventional known processes wherein thermoplastic materials, for example polyethylene terephthalate, are first taken to a melt state and then molded for example by blow molding techniques, or injection molding techniques, or combinations thereof, into a final container or bottle. Thus for example the present polyesters can be melt molded into bottles or jars by techniques wherein, for example, a parison is first formed by a blow molding, or injection molding, operation and wherein the parison is biaxially stretched or oriented and formed into a final configuration, again for example, by blow molding. Thus copolyesters as contemplated in the present invention may be melt molded to clear bottles and containers for use in the packaging industry using any of the techniques known in the art for forming melt molded containers.

While the foregoing describes the present invention with sufficient particularity to enable those skilled in the art to make and use same there nonetheless follows, for exemplary purposes only, a specific example.

EXAMPLE I

A polyester was prepared having the following repeating units in its backbone:

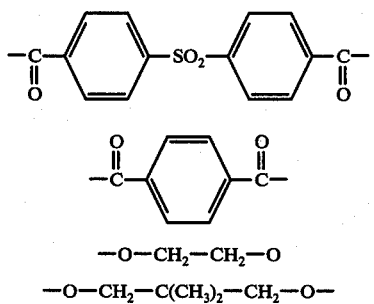

Based on the proportions of the polyester forming precursors used in the reaction the mole ratio of b:a was about 50:50 and the mole ratio of c:d was 80:20. The specific charge of ingredients, or precursors, was about 0.0386 moles of dimethyl sulfonyldibenzoate, about 0.0386 moles of dimethyl terephthalate, about 0.1544 moles of ethylene glycol, and about 0.0386 moles of neopentyl glycol (2,2-dimethyl-1,3-propanediol). For catalytic purposes the charge also included about 8.47 milligrams of $Zn(C_2H_3O_2)_2 \cdot 2H_2O$ and about 4.26 milligrams of $Sb_2O_3$.

The mixture of the starting materials were weighed into a 300 ml, 3-necked round bottom flask equipped with a stirrer, nitrogen inlet tube, and a condenser. The contents of the flask were heated at about 195° to about 205° C. for 3 hours with nitrogen flowing into the reaction flask to provide a nitrogen blanket. About 80% of the theoretical methanol by-product was removed. After this 3 hour period at 195° to 205° C. the contents were then heated to about 260° C. and a vacuum of about 24 mm Hg was applied and the system held for about 1 hour. Ethylene glycol, neopentyl glycol and by product methanol was removed. The condensation of the prepolymer polyester was then continued at a temperature of about 285° to about 295° C. and was maintained there for a period of about 3-4 hours under a vacuum of about 0.5 millimeters of mercury. During this time excess ethylene glycol and neopentyl glycol were further removed by distillation. After this period the polymer was removed and found to have a glass transition temperature, as measured with a Differential Scanning Calorimeter, of about 117° C., and an oxygen permeability, as measured by ASTM D-1434-66, of about 8.9 cc.mil/100 in.$^2$·day·atm. at about 73° F. and 50% relative humidity and a $CO_2$ permeability of about 58.6 cc.mil/100 in.$^2$·day·atm. and a water vapor transmission of about 1.46 (ASTM-E-96-66). The polymer was easily formed into a flexible clear film, and had an inherent viscosity of 0.57 (0.25% polymer in a 60/40 weight percent solution of tetrachloroethane and phenol).

Following the known forming procedures of the prior art, e.g. U.S. Pat. No. 3,733,309, a biaxially oriented container (i.e. a container having a bottom wall and a circumferential sidewall merging with and proceeding upwardly from the bottom wall, the sidewall at its upper margin tapering inwardly and merging with a neck portion defining a mouth opening) is formed from the above-produced polyester of this invention. This container is clear and upon being filled by placing foodstuffs, beverages, medicines and the like therein and closing the container shows excellent characteristics for packaging of such products. A similar bottle, but one which is not oriented also shows excellent characteristics for packaging but is weaker.

In a similar manner a polyester was produced using the polyester synthesis procedure as above but without any dimethyl terephthalate. That is the ratio of c:d was about 80:20 and the ratio of b:a was 0:100. The polyester had a glass transition temperature of about 137° C. but its permeability characteristics are unsatisfactory ($O_2$ = 20.3 and $CO_2$ = 147).

I claim:

1. A linear copolyester which can be melted and molded to a clear container, the repeating units of said polyester consisting essentially of

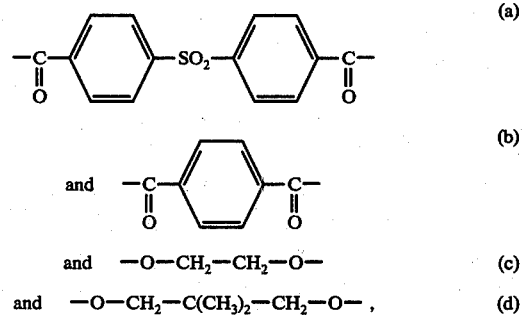

said polyester having an oxygen permeability of less than 15 cc.mil/100 in.$^2$·day·atm. and a glass transition temperature in excess of 72° C., said (a) and (b) units and said (c) and (d) units respectively being the units formed by reactively combining polyester forming precursors thereof in an amount of at least one mole of the precursors of said (c) and (d) units per mole of precursors of said (a) and (b) units and wherein the precursors of said units in forming said polyester by said reactive combining are in a molar ratio of said (b) unit precursor to said (a) unit precursor of about 90:10 to about 40:60 and a molar ratio of said (c) unit precursor to said (d) unit precursor of about 80:20.

2. The copolyester of claim 1 wherein said precursor ratio of (b) to (a) units is about 50:50, said copolyester having an oxygen permeability of about 9 and a glass transition temperature of about 117° C.

3. In a method of forming a polyester by reactively combining at least one polyester forming dicarboxylic acid, ester or halide thereof with at least a stoichiometric amount of at least one polester forming dibasic alcohol, under conditions of temperature, pressure and catalysis so as to form a polyester, the improvement wherein said acid, ester or halide consists essentially of (1) p,p'-sulfonyldibenzoic acid, esters thereof, or halides thereof and (2) terephthalic acid, esters thereof, or halides thereof, and wherein said alcohol consists essentially of (3) ethylene glycol and (4) neopentyl alcohol, the mole ratio of (2) to (1) being about 90:10 to about 40:60 and the mole ratio of (3) to (4) being about 80:20.

* * * * *